United States Patent [19]
Gauger et al.

[11] Patent Number: 5,575,531
[45] Date of Patent: *Nov. 19, 1996

[54] VEHICLE POWER SEAT ADJUSTER WITH END DRIVEN LEAD SCREW ACTUATION

[75] Inventors: Derek K. Gauger, Ann Arbor; Max O. Heesch, Brooklyn; Richard W. A. Rees, Auburn Hills, all of Mich.

[73] Assignee: ITT Corporation, New York, N.Y.

[ * ] Notice: The term of this patent shall not extend beyond the expiration date of Pat. No. 5,445,354.

[21] Appl. No.: 167,732

[22] Filed: Dec. 15, 1993

[51] Int. Cl.$^6$ .................................................. B60N 2/02
[52] U.S. Cl. ................... 297/362.11; 297/344.1; 248/429
[58] Field of Search ............... 297/344.1, 362.4, 297/344.11, 362.12; 74/89.15; 248/429

[56] References Cited

U.S. PATENT DOCUMENTS

| | | |
|---|---|---|
| 2,929,439 | 3/1960 | Tanaka et al. . |
| 3,617,021 | 11/1971 | Littmann . |
| 3,930,632 | 1/1976 | Shigeta et al. . |
| 3,951,004 | 4/1976 | Heesch . |
| 4,015,812 | 4/1977 | Heesch . |
| 4,274,293 | 6/1981 | Ruger . |
| 4,432,583 | 2/1984 | Russo et al. . |
| 4,448,381 | 5/1984 | Anspaugh et al. . |
| 4,720,073 | 1/1988 | Mann et al. . |
| 4,802,374 | 2/1989 | Hamelin et al. . |
| 4,832,403 | 5/1989 | Tomita ............... 297/344.1 X |
| 4,892,282 | 1/1990 | Suzuki et al. . |
| 4,940,285 | 7/1990 | Suzuki et al. . |
| 4,948,189 | 8/1990 | Terada et al. . |
| 4,949,585 | 8/1990 | Dauvegne et al. . |
| 4,962,963 | 10/1990 | Robinson . |
| 5,014,958 | 5/1991 | Harney . |
| 5,048,886 | 9/1991 | Ito et al. . |
| 5,112,018 | 5/1992 | Wahls . |
| 5,125,611 | 6/1992 | Cox ........................... 248/429 |
| 5,150,872 | 9/1992 | Isomura . |
| 5,172,601 | 12/1992 | Siegrist et al. . |
| 5,192,045 | 3/1993 | Yamada et al. . |
| 5,199,764 | 4/1993 | Robinson ............... 297/362.11 |
| 5,207,473 | 5/1993 | Nawa et al. . |
| 5,259,257 | 11/1993 | Mouri ............... 297/344.1 X |
| 5,292,178 | 3/1994 | Loose et al. ............... 297/344.1 |
| 5,445,354 | 8/1995 | Gauger et al. ............... 248/429 |
| 5,456,439 | 10/1995 | Gauger ............... 248/429 |
| 5,467,957 | 11/1995 | Gauger ............... 248/429 |

FOREIGN PATENT DOCUMENTS

| | | |
|---|---|---|
| 0067123 | 12/1982 | European Pat. Off. . |
| 0317381 | 5/1989 | European Pat. Off. . |
| 3918424 | 6/1989 | Germany . |
| 2245333 | 1/1992 | United Kingdom . |
| 2260898 | 5/1993 | United Kingdom . |

*Primary Examiner*—Milton Nelson, Jr.
*Attorney, Agent, or Firm*—Robert P. Seitter; J. Gordon Lewis

[57] ABSTRACT

A power seat adjuster includes a rotatable drive shaft with first and second axial ends and an intermediate arcuate portion connecting the first and second axial ends. The first and second axial ends are respectively axially connected to a drive motor gear assembly and to a driven lead screw. A horizontal drive block threadingly engaging the lead screw is rotatably and vertically translatingly mounted in an aperture in a lower track for self-alignment of the drive block with respect to the lead screw. A housing rotatably receives the axial connection between one end of the drive shaft and the lead screw. The bearing block is rotatably and translatingly mounted in a bracket fixed to an upper track for self-alignment of the drive shaft with the lead screw. A drive block engages the lead screw and is mounted for rotation and translation in a link. The upper and lower tracks have a guide section and an abutment section which collapse together in a self-cinching action under force loading to resist separation of the upper and lower tracks.

30 Claims, 7 Drawing Sheets

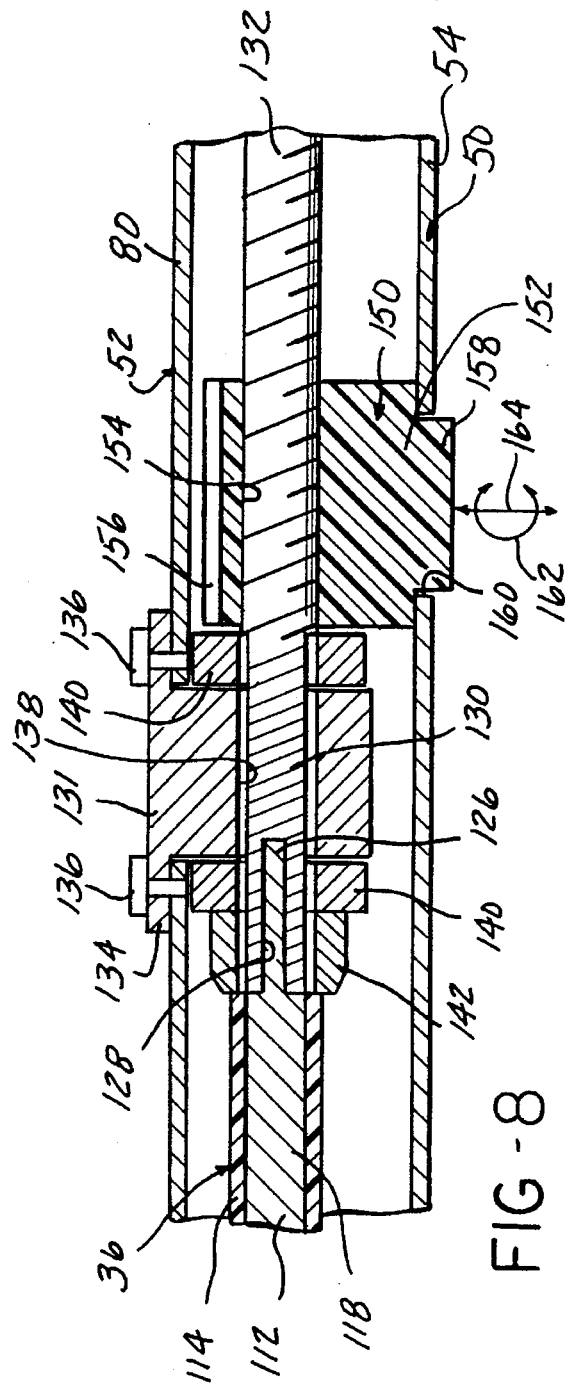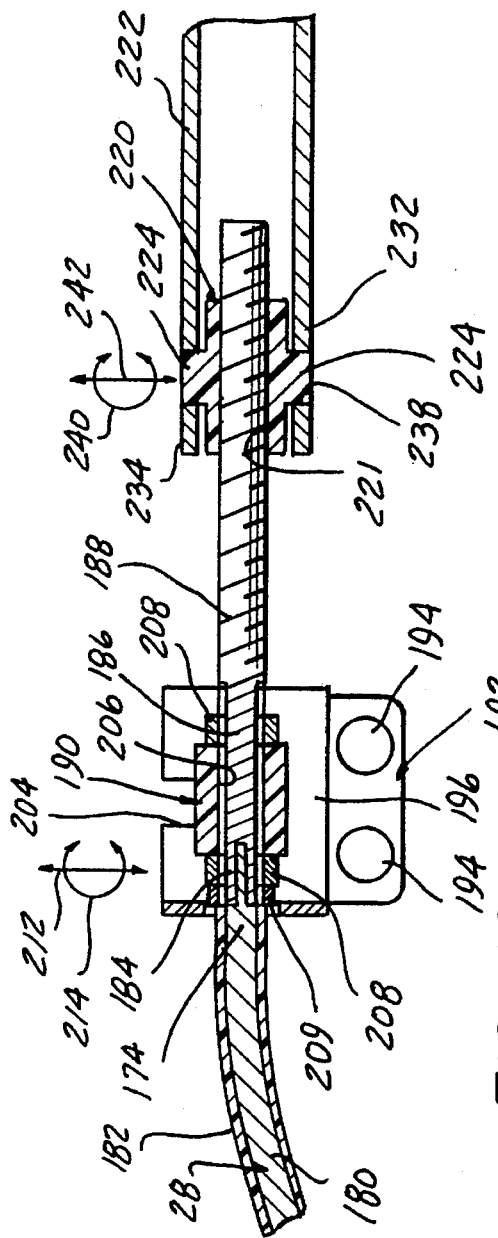

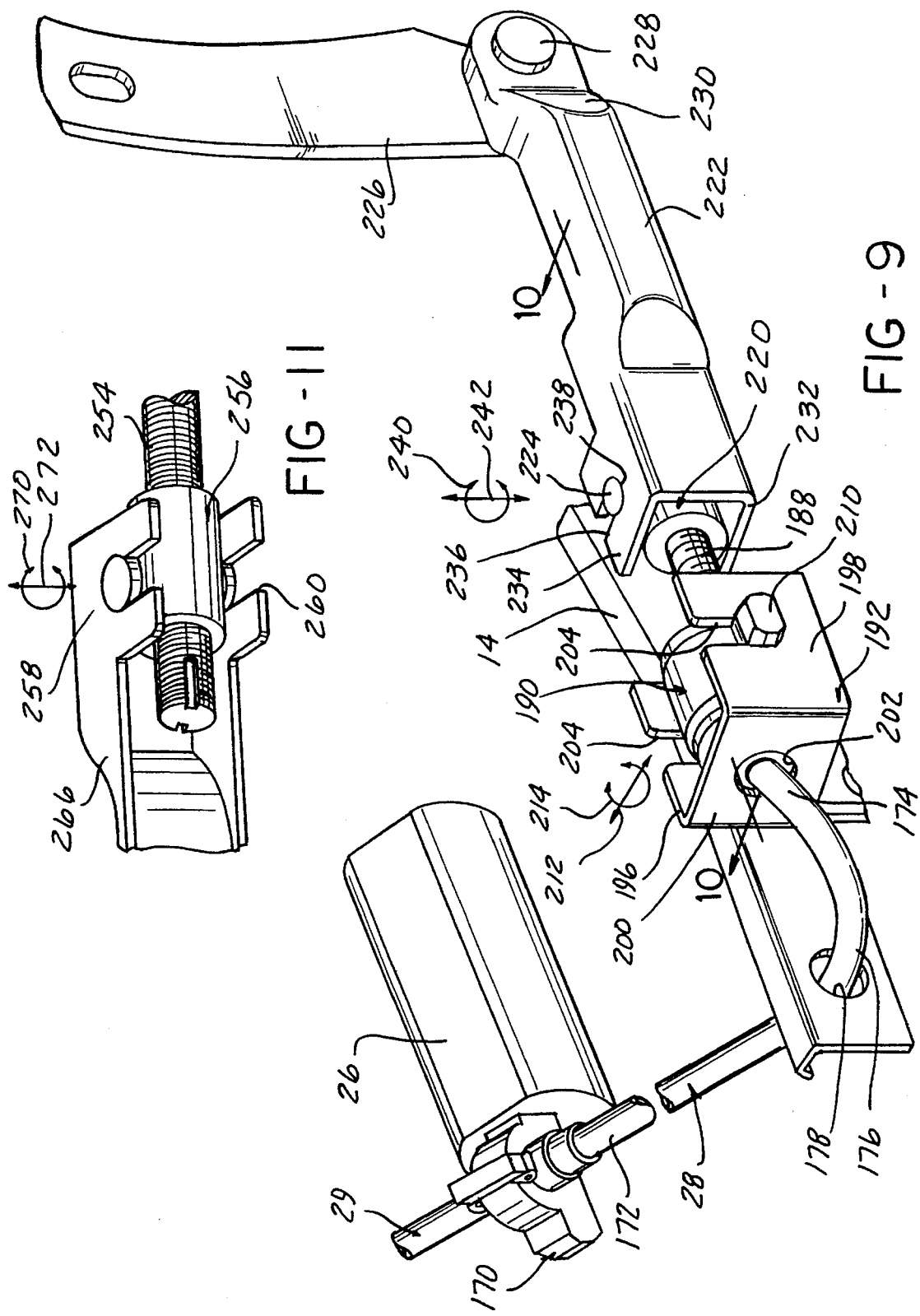

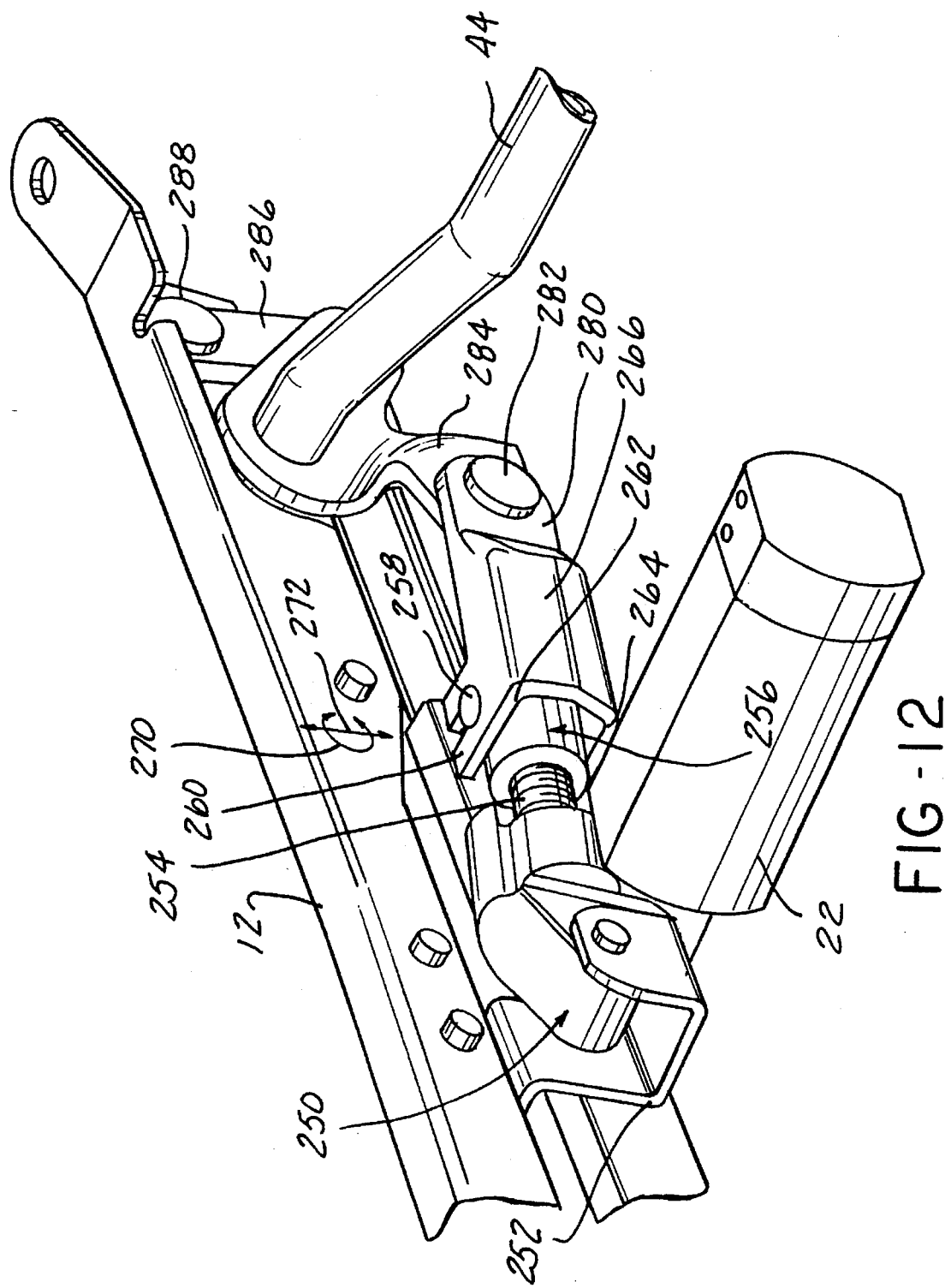

VEHICLE POWER SEAT ADJUSTER WITH END DRIVEN LEAD SCREW ACTUATION

BACKGROUND OF THE INVENTION

The present invention relates, in general, to vehicle seats and, more specifically, to adjusters for vehicle seats.

DESCRIPTION OF THE ART

Power seat adjusters are a popular option on many automotive vehicles and are frequently offered as standard equipment on higher priced vehicles. Such power seat adjusters are primarily used on the driver's seat and, sometimes, on the front passenger seat of the vehicle to provide selective horizontal fore and aft and vertical movement of the seat as well as seat back recliner movement to accommodate occupants of different size and height as well as to provide a comfortable seating position to suit each occupant's preference.

Such power seat adjusters typically carry a seat support frame which supports the seat bottom and sometimes the seat back of a vehicle seat. The seat support frame is mounted on first and second, spaced track assemblies, each formed of an upper track which is connected to the seat support frame and which is slidably mounted on a lower track anchored to the vehicle floor. A drive mechanism typically includes a bi-directional electric motor which rotates a pair of drive shafts extending outward from the motor to a gear assembly or box mounted on each upper track. In one arrangement, each gear box rotates a lead screw extending longitudinally below each upper track. A drive block is fixedly mounted to each lower track and threadingly receives the lead screw to cause reciprocal, horizontal movement of the upper track and the attached seat support frame upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge seat adjustment drive mechanisms for selectively tilting the front and rear edges of the seat bottom independent of each other as well as simultaneously to raise and lower the entire vehicle seat or, in some applications, only the seat bottom or cushion.

Each vertical and recliner drive mechanism also includes a drive motor having a rotatable output shaft connected to a gear assembly either directly in the case of the front and rear vertical drive mechanisms or by means of two shafts extending from a single motor to separate gear assemblies mounted on each upper track or on the seat support frame in the case of a seat recliner drive mechanism.

As the various drive motors are mounted between the track assemblies, the drive motor output shafts and the drive shafts connected thereto are typically oriented perpendicular to the axis of the associated lead screw. In order to transmit rotation and drive force between the output shaft of the drive motor and the drive shaft connected thereto to the 90° offset lead screw, each gear assembly or box typically includes a worm gear which is insert molded on one end of the associated lead screw. A worm is rotatably mounted in the gear box housing in meshing engagement with the worm gear and is connected to one of the drive motor output shafts or to one of the drive shafts so as to rotate the worm gear and thereby the lead screw upon bi-directional energization of the selective drive motor. Thus, each drive motor requires a separate gear assembly for each lead screw driven by the drive motor. This results in additional components on the power seat adjuster which add cost and take up valuable space in the already crowded space below a vehicle seat.

The rigid connection between the gears in the gear assembly, the drive shaft motor output shaft, the drive shaft, the lead screw and the drive block also leads to additional problems during assembly and operation of a power seat adjuster. It is inevitable in the manufacture and assembly of a mechanical mechanism, such as a power seat adjuster, that poor dimensional conditions, such as concentricity, TIR, and linear discrepancies from nominal design dimensions, can and typically do occur. These dimensional conditions, without correction, can cause various problems in the operation of a power seat adjuster, such as poor breakaway from a stop position, slow operation of the power seat adjuster in extreme temperatures, excessive wear of the components of the power seat adjuster, uneven operation of the power seat adjuster, and the generation of unpleasant sounds or noise during the operation of the power seat adjuster.

Another aspect of a power seat adjuster which is critical in the use of a power seat adjuster, particularly during excessive forces generated during a vehicle collision, is the requirement for seat integrity. As the occupant's seat belt is frequently attached by a seat belt buckle mounting bracket directly to one of the upper tracks of a power seat adjuster to enable the seat belt to move fore and aft with the upper track, any forces exerted on the occupant during a vehicle collision are transmitted directly through the seat belt buckle mounting bracket to the upper track. These forces cause the upper track to move upward with respect to the lower track and, in the event of excessive force, could lead to a complete pullout or separation of the upper track and the attached seat from the lower track. In order to prevent track separation, seat integrity requirements have necessitated the design of the components of a power seat adjuster and, in particular, the design of the upper and lower tracks with high strength materials and in sufficient thicknesses to resist track separation. However, the ever present goal of cost containment and weight reduction has led to the use of extruded aluminum seat tracks. In order to meet strength requirements, such aluminum seat tracks have been provided in large thicknesses or with steel reinforcements, both of which are undesirable in view of cost and weight reduction goals.

U.S. Pat. No. 5,213,300, assigned to the assignee of the present invention, discloses an extruded aluminum seat track assembly for a power seat adjuster which has elongated abutment surfaces formed in each upper and lower track which engage each other under force loading to resist track separation. In this track assembly, cooperating pairs of abutment surfaces in the form of complimentary, J-shaped hooks are formed in each upper and lower track. The pairs of abutments or hooks are arranged such that one complimentary pair of abutments on the upper and lower tracks are spaced further apart than the other pair of abutments during normal operation of the power seat adjuster. Under high force loading, the first pair of abutments engage to provide a first level of track separation resistance, before the other pair of abutment surfaces engage to further resist separation of the upper and lower tracks.

While effective, such a track configuration requires a complex extrusion and close tolerance control of the position of the various abutments on the upper and lower tracks.

Thus, it would be desirable to provide a power seat adjuster for a vehicle seat which overcomes certain deficiencies found in previously devised power seat adjusters. It would be desirable to provide a power seat adjuster having a unique lead screw actuation which enables certain gear assemblies to be eliminated so as to reduce cost, weight, and space requirements as well as the undesirable noise associated with the operation of multiple gear assemblies. It would also be desirable to provide a power seat adjuster having a unique lead screw actuation which permits the use of lower flex shaft rotation speeds with higher torque to reduce noise and vibration in the power seat adjuster. It would also be desirable to provide a power seat adjuster with a unique lead screw actuation which provides more freedom in designing the mounting positions of the drive motors and the drive shafts. It would also be desirable to provide a power seat adjuster having a self-aligning lead screw actuator which overcomes poor dimensional problems, such as concentricity, TIR, and linear discrepancies in dimensions and positions of various components of the power seat adjuster. It would also be desirable to provide a power seat adjuster having a self-aligning drive nut which overcomes poor dimensional problems encountered in the manufacture and assembly of power seat adjuster components and, further, which eliminates components and the associated assembly time and labor required in prior art power seat adjusters which have a fixed mounting of the drive block to the lower track. It would also be desirable to provide a power seat adjuster having a track assembly formed of extruded, high strength, lightweight aluminum at minimal track section thicknesses which has a strong design to resist separation of the upper and lower tracks under vehicle collision force loads.

SUMMARY OF THE INVENTION

The present invention is a power seat adjuster for a vehicle seat which provides one or more of horizontal fore and aft, vertical up and down, separate front and rear elevation, as well as seat back recliner adjustments.

In a broad embodiment, the present invention comprises a drive apparatus for a power seat adjuster which includes a rotatable drive shaft having first and second axial ends and an intermediate arcuate portion connecting the first and second axial ends. A driven shaft is axially connected to the second end of the drive shaft. Means are provided for rotating the first end of the drive shaft, with the drive shaft transmitting such rotation to rotation of the driven shaft. The drive shaft is flexible and the first and second axial ends thereof are preferably oriented substantially perpendicular to each other. The rotating means includes a drive motor having a rotatable output shaft which is coupled to a gear assembly which is in turn coupled to the first axial end of the drive shaft to transmit rotation of the motor output shaft to rotation of the drive shaft.

In a more specific embodiment, the power seat adjuster includes first and second track assemblies, each formed of a lower track fixed to a vehicle and an upper track slidably mounted on each lower track. A drive motor means is coupled to a first drive shaft. The first drive shaft includes first and second axial ends which are disposed along non-coaxial axes, and an intermediate, arcuate portion connecting the first and second axial ends. A first driven shaft is also provided. Means are provided for coaxially connecting the second axial end of the first drive shaft to the first driven shaft to transmit rotation of the first drive shaft to rotation of the first driven shaft.

The means for coaxially connecting the first drive shaft and the first driven shaft preferably comprises a bracket means fixedly mounted to one of the upper tracks. A housing mounted in the bracket means rotatably receives the fixed connection between the second axial end of the first drive shaft and one end of the first driven shaft. A drive block is drivingly engaged with the first driven shaft and mounted on the lower track against axial movement with respect to the lower track.

In this embodiment, the first driven shaft is preferably a flexible shaft with the first and second axial ends disposed substantially perpendicular to each other. In addition, the intermediate portion of the first drive shaft connecting the first and second axial ends thereof extends arcuately through stationary structure on the power seat adjuster.

The drive motor means preferably comprises a bi-directional electric drive motor having a rotatable output shaft and gear means coupled to the motor output shaft and the first axial end of the first drive shaft which transmits rotation of the motor output shaft to rotation of the first drive shaft.

In a further embodiment, a second drive shaft is coupled to the gear assembly on the drive motor and also has first and second axial end portions connected by an intermediate, arcuate portion. A second driven shaft is mounted within an opposed upper and lower track assembly. Means are provided for coaxially connecting the second axial end of the second drive shaft to one end of the second driven shaft.

In another embodiment, the power seat adjuster includes a link which is connected to a pivotal seat back extension of the vehicle seat. In this embodiment, a second axial end portion of a first drive shaft is fixedly connected to a first end of a first driven shaft. Means are provided for mounting the connection between the second axial end of the drive shaft and the first end of the driven shaft to one of the upper tracks or seat support frames. The mounting means is preferably fixedly attached to one of the seat support frames of the power seat adjuster. Means are connected to the link to transmit rotation of the driven shaft to translation of the link and pivotal movement of the seat back extension and the seat back attached thereto.

According to another aspect of the present invention, the power seat adjuster includes a rotatable drive shaft having a first end which is fixedly connected by a fixed connection to one end of a rotatable, threaded driven shaft. A drive block is threadingly mounted on the driven shaft for causing movement of the upper track with respect to the lower track upon rotation of the driven shaft. A drive member is provided with a first end. Means are provided for fixedly axially mounting the drive block to the driven member for movement of the drive block longitudinally along the driven shaft upon rotation of the driven shaft and translation of the drive member and for allowing drive block movement about one of a rotational axis extending transversely to a longitudinal axis of movement of the drive block along the driven shaft and translatingly within one end of the drive member. In this embodiment, the mounting means preferably comprises a pair of spaced legs formed on one end of the driven member. A slot is formed in each leg and receives one of a pair of lugs formed on and extending outward from opposite sides of the drive block. Each lug is movably mounted in one of the slots and permits pivotal movement of the drive block with respect to the legs on the drive member about an axis extending through the pair of lugs. The width of the drive block is less than the width of the space or gap between the legs at one end of the drive member to permit lateral translation of the drive block between the legs at one end of the drive member.

In this embodiment, a housing is also affixed to the seat support frame. The housing has spaced side walls, each having a slot formed therein. A drive nut has a bore rotatably receiving the fixed connection between the drive shaft and the driven shaft. Means are provided for mounting the drive nut in the housing for movement of the drive nut relative to the housing in at least one of a rotational movement about an axis transverse to the bore in the drive nut and translatingly between the side walls of the housing. The drive nut mounting means preferably comprises a pair of lugs which extend outward from opposite sides of the drive nut and are each movably mounted in one of the slots in each side wall of the drive member. The lugs permit pivotal movement and lateral translation of the drive nut with respect to an axis extending between the lugs and between the side walls of the housing, respectively.

According to another aspect of the present invention, a drive block has a threaded bore threadingly receiving a lead screw. Co-acting means are formed on the drive block and the lower track for allowing the drive block to move in at least one of a rotational movement about an axis vertically transverse to the bore in the drive block and a vertical translating movement with respect to the lower track. The co-acting means preferably comprises a boss extending from the drive block which is freely mounted in a slightly larger aperture formed in the lower track. Further, the upper track is spaced a predetermined distance from an upper surface of the drive block, with the predetermined distance being less than the length of extension of the boss on the drive block through the aperture in the lower track so as to retain the drive block in the aperture in the lower track. In this embodiment, the drive block is preferably formed of a plastic material.

In yet another aspect, a seat track apparatus is disclosed which includes first and second elongated tracks slidably engaged for relative longitudinal movement therebetween. The first track has first and second spaced pairs of flanges, with one first flange and one second flange extending outward from each one of a pair of spaced side walls on the first track. The first pair of flanges are each formed with a first abutment surface. The second track has third and fourth pairs of flanges, with one third flange and one fourth flange extending inwardly from each one of a pair of side walls on the second track. The third pair of flanges are each formed with a second abutment surface which is normally spaced from the first abutment surface on the first track. The fourth pair of flanges are spaced from the third pair of flanges to form a channel therebetween which receives one of the second flanges of the first track therein for guiding the sliding movement of the first track with respect to the second track. The first, second, third and fourth pairs of flanges and at least certain of the side walls of the first and second tracks are deformable under forces tending to separate the first track from the second track into self-cinching engagement with each other to resist such separation. In this embodiment, the first and second tracks are each preferably formed as extruded, one-piece, unitary members of aluminum.

The power seat adjuster of the present invention overcomes certain deficiencies encountered in previously devised power seat adjusters. The unique end driven lead screw actuation of the present power seat adjuster eliminates the need for separate gear assemblies to connect each drive shaft driven by a single drive motor to an associated driven shaft or lead screw. This eliminates additional components from the power seat adjuster in the case of horizontal and seat back recliner drive mechanisms, for example, and thereby reduces cost, weight and minimizes space requirements of the power seat adjuster. Furthermore, by eliminating gear assemblies, the unpleasant noise associated with the operation of multiple gear assemblies by a single drive motor is also reduced. The end driven lead screw actuation also permits the use of slower flexible shaft rotation speeds with higher torque to further reduce noise and vibration. The present end driven lead screw actuator also permits a more flexible mounting position for the drive motors and the drive shafts on a power seat adjuster.

The self-aligning lead screw actuator feature of the present invention overcomes any poor dimensional problems, such as concentricity, TIR, and linear discrepancies from nominal dimensions and positions of the components of the power seat adjuster. The self-aligning drive block and/or feature of the present invention also overcomes such poor dimensional problems and, further, eliminates components and attendant assembly time and labor required in previous drive block mounting arrangements which involved a fixed mounting and associated brackets and/or fasteners to fixedly attach the drive block to the lower track of a power seat adjuster.

Finally, the unique track assembly of the present invention enables the upper and lower tracks to be formed of extruded, lightweight, high strength aluminum at minimum sectional thicknesses while still providing a strong design which resists separation of the upper and lower tracks from each other under vehicle collision force loads.

BRIEF DESCRIPTION OF THE DRAWING

The various features, advantages and other uses of the present invention will become more apparent by referring to the following detailed description and drawing in which:

FIG. 8 is a cross sectional view generally taken along line 8—8 in FIG. 7;

FIG. 9 is a perspective view of the seat recliner drive mechanism of the power seat adjuster of the present invention;

FIG. 10 is a cross sectional view generally taken along line 10—10 in FIG. 9;

FIG. 11 is a partial, perspective view of the drive block, lead screw and drive link of the seat recliner drive mechanism shown in FIG. 9; and FIG. 12 is a perspective view of the rear vertical elevation drive mechanism of the power seat adjuster of the present invention.

DESCRIPTION OF THE PREFERRED EMBODIMENTS

Figure 1:
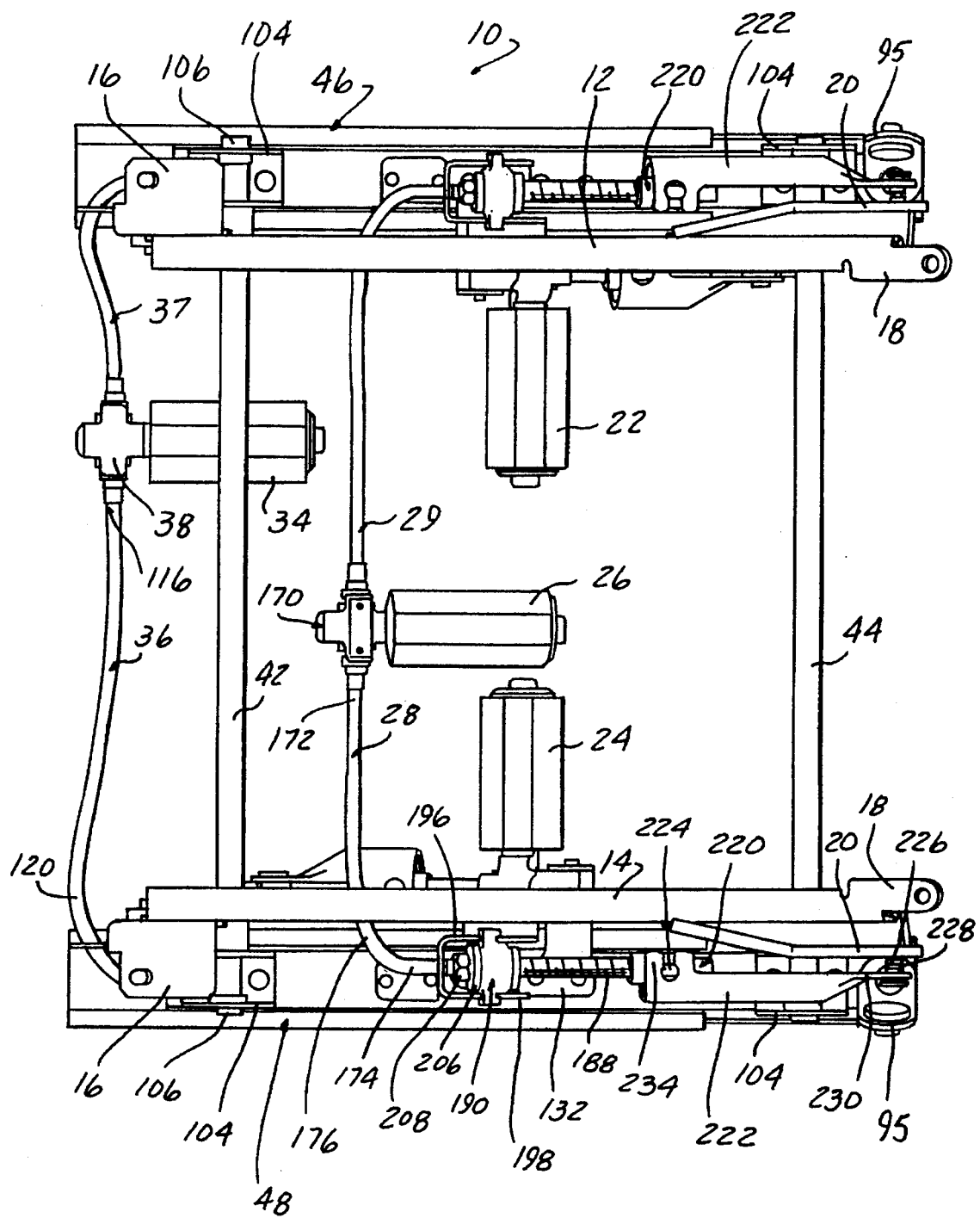
FIG. 1 is a plan view of a power seat adjuster constructed in accordance with the teachings of the present invention.
Figure 2:
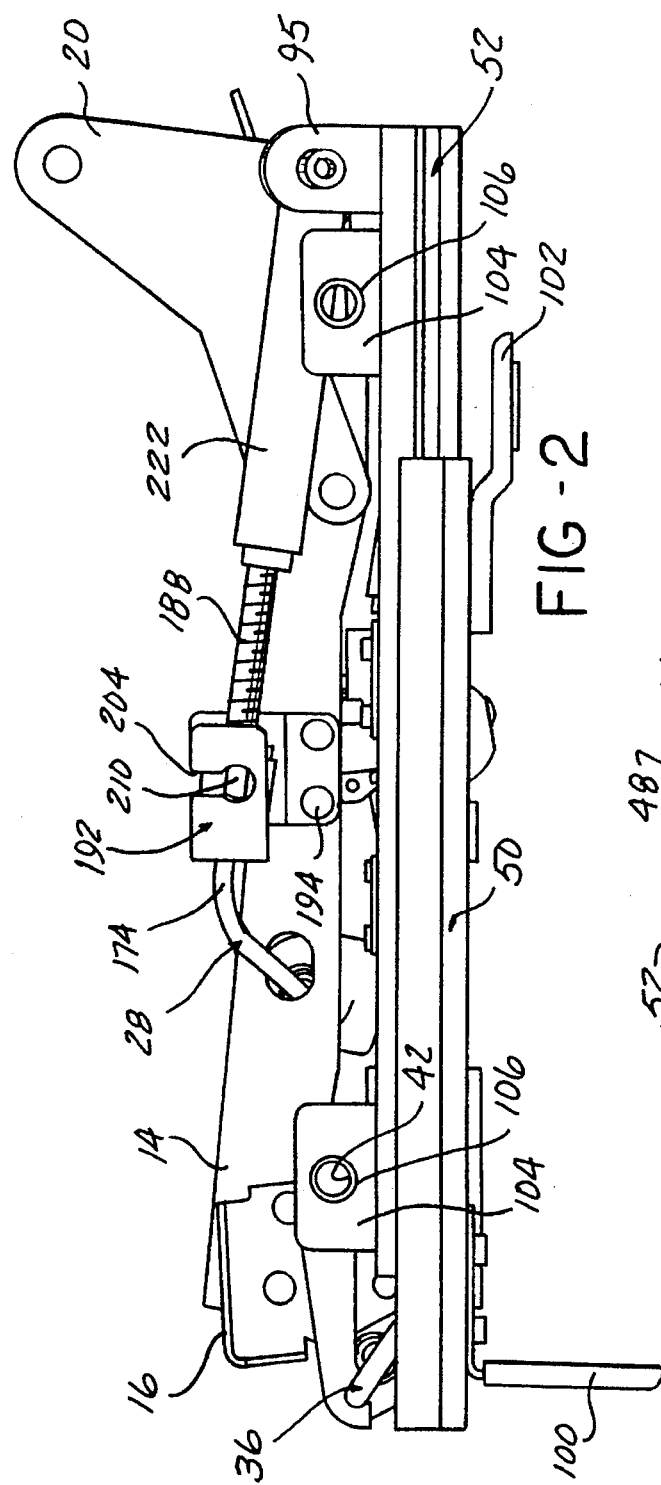
FIG. 2 is a side elevational view of the power seat adjuster shown in FIG. 1.

Referring now to the drawing, and to FIGS. 1 and 2 in particular, there is illustrated a power seat adjuster 10 which variably positions an automotive vehicle seat in any occupant selected position. The power seat adjuster 10 is a so-called "eight-way" adjuster providing horizontal fore/aft, vertical up and down, independent movement of each of the front and rear edges of the adjuster as well as pivotal tilting of the seat back with respect to the seat bottom. It will be understood, however, that the present invention described hereafter is employable with a power seat adjuster which includes at least one of such movements or adjustments, such as a horizontal fore/aft movement by itself or in combination with any number of the other such movements described above, each of which can also be used separately.

As is conventional, the power seat adjuster 10 supports a conventional vehicle seat, not shown, which includes a seat bottom or cushion and a seat back. An upper seat support frame is provided on the power seat adjuster 10 for supporting and connecting the seat bottom and the seat back to the power seat adjuster 10. The upper seat support frame includes a pair of spaced, longitudinally extending frame members or rails 12 and 14. Mounting brackets 16 are mounted on the front end and a mounting surface 18 is formed at the rear end of the frame members 12 and 14 to provide a mounting surface for connecting the seat bottom to the upper support frame. It will be understood that in lieu of the seat support frame members 12 and 14, suitable mounting brackets may be provided on the power seat adjuster 10 for direct attachment of a seat bottom of a vehicle seat to the power seat adjuster 10. A pair of seat back pivot brackets 20 are mounted on each of the seat support frame members 12 and 14 and provide a pivot connection to the seat back, not shown, to permit selective tilting or pivotal movement of the seat back with respect to the seat bottom as is typical in so-called "seat recliners".

Various drive assemblies are mounted on the power seat adjuster 10 to provide selective movement of the power seat adjuster along various axes. For example, front and rear vertical drive motors 22 and 24, respectively, are mounted on the power seat adjuster 10 and connected to conventional lead screws and drive blocks or nuts to independently elevate front and rear edges of the seat support frame members 12 and 14, respectively, and, thereby, to provide selective vertical adjustment of the front and rear edges of the vehicle seat. In addition, a seat back recliner drive motor 26 drives a pair of rotatable drive shafts 28 and 29, which are coupled to individual lead screws. Each lead screw, as described hereafter, is connected by a drive link to one of the seat back pivot brackets 20 mounted on opposite sides of the power seat adjuster 10 to provide selective pivotal adjustment of the seat back with respect to the seat bottom of a vehicle seat mounted on the seat support frame members 12 and 14.

The power seat adjuster 10 also includes a horizontal drive means formed of a bi-directional electric motor 34 which is fixedly mounted to one of the upper tracks of the power seat adjuster 10 by means of a suitable bracket, not shown. A pair of rotatable drive shafts 36 and 37 extend outward from a gear assembly or box 38 integrally connected to the output shaft of the drive motor 34 to a rotatable connection with a lead screw disposed in each of a pair of opposed track assemblies as described hereafter.

The power seat adjuster 10 also includes front and rear tubular torsion tubes or rods 42 and 44, respectively, which extend between and are connected to opposed track assemblies denoted generally by reference numbers 46 and 48 to provide a rigid support structure for the power seat adjuster 10.

As each of the track assemblies 46 and 48 is identically constructed, the following description will be provided only for track assembly 48. It will be understood that the opposite track assembly 46 is constructed in the same manner.

As shown in FIGS. 3–6, the track assembly 48 includes a lower track 50 and an upper track 52. The upper track 52 is slidably disposed within the lower track 50 and is reciprocatingly, bi-directionally movable along the lower track 50 under the control of the horizontal drive means. The lower track 50 is formed as an integral, one-piece member having a substantially planar central base wall or web 54 and a pair of identically formed side legs or walls 56 and 58 which extend outwardly from the central base wall 54. Each of the side legs 56 and 58 is formed with a substantially vertically extending, outer side wall portion 60 which terminates in an inward facing top or fourth flange 62 extending toward the opposed side leg 56 or 58. An intermediate or third flange 64 extends inwardly from the side wall 60 and is spaced from the top flange 62 to form a first channel 66 therebetween. The intermediate flange 64 terminates in a downward extending abutment or hook 68 which extends toward, but is spaced from the central base 54 of the lower track 50. The tip 69 of the abutment or hook 68 is spaced from the side leg 60 to form an abutment surface 70 therebetween. The abutment surface 70 extends from the tip 69 of the abutment 68 to the side wall 60, as shown in detail in FIG. 4. A second channel 72 is formed between the abutment 68 and the central base 54. The opposed side wall 60 has an identical configuration with a top flange 62, an intermediate flange 64, a first channel 66, an abutment 68, a second channel 72 and an abutment surface 70 formed between the abutment 68, the adjacent inner surface of the side wall 60 and the central base wall 54.

The upper track 52 includes a central web or top wall or web 80 which is oriented in a general horizontal position in the normal mounting position of the upper track 52. A pair of depending side legs or walls 82 and 84 depend from outer edges of the top wall 80. The side legs 82 and 84 each include a second outwardly extending flange 86 which is generally planar in configuration and is slidably disposed within the first channel 66 formed between the top flange 62 and the intermediate flange 64 of a side wall 60 of the lower track 54. A slide member or shoe 88 is mounted on the exterior surface of each flange 86 and slidably engages the inner surface of the channel 66 to provide easy sliding movement of the first flange 86 of the upper track 52 within the channel 66 in the lower track 54. The slide member 88 is formed of a suitable low friction plastic material. Further, the slide member 88 may have a continuous C-shaped cross section along its entire length or it may be formed with spaced flat areas between C-shaped cross section portions.

The side legs 82 and 84 of the upper track 52 terminate in a lower abutment 90 which extends upward from a lower end 92 or first flange into the second channel 72 formed between the intermediate flange 64, the side wall 60 and the central base wall 54 of the lower track 50. The abutment 90 terminates in a tip 94 which is normally spaced from the abutment surface 70 formed in the lower track 50.

Figure 4:
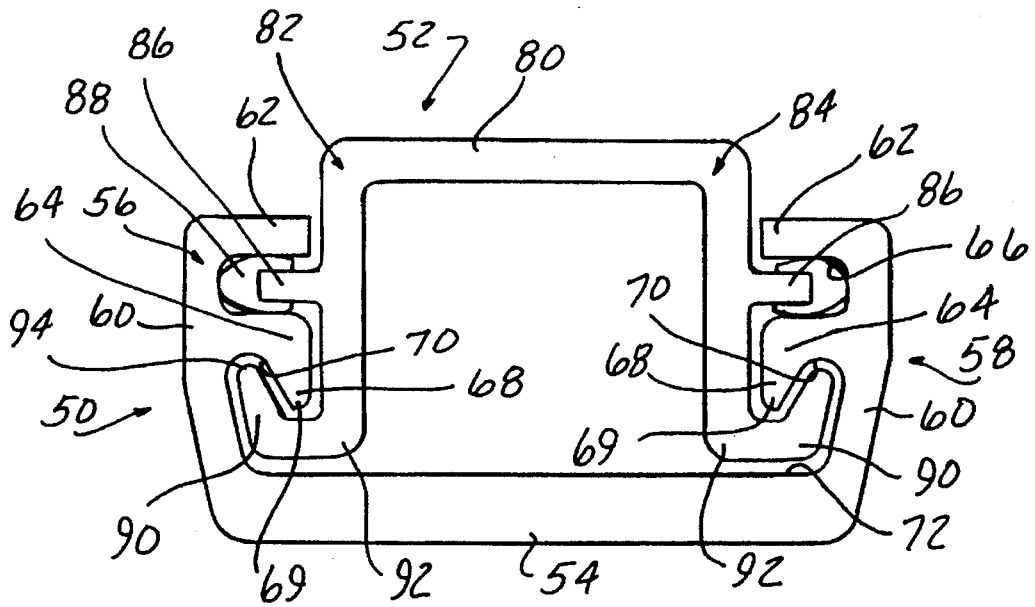
FIG. 4 is an end view of an assembled upper and lower track assembly.

In a normal mounting position of the upper track 52 and the lower track 50, all sliding contact between the upper track 52 and the lower track 50 takes place between the plastic slide 88 on the flange 86 on each side leg 82 and 84 of the upper track 52 and the inner surfaces of the top flange 62, the intermediate flange 64 and a portion of each side wall 60 of the lower track 50. The complimentary shaped abutments 68 and 90 on the lower track 50 and the upper track 52, respectively, are normally spaced apart, as shown in FIG. 4 and do not come into contact with each other during normal sliding movement of the upper track 52 in the lower track 50.

Figure 5:
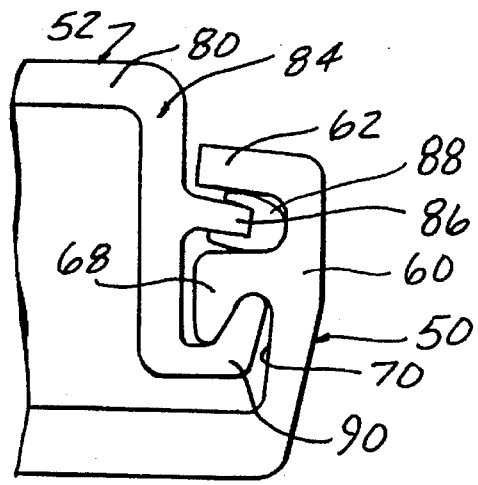
FIG. 5 is a partial end view showing the position of the upper and lower tracks during the first stage of a vehicle collision.

However, during a vehicle collision, forces or loads are transmitted from the occupant seat belt through a seat belt mounting bracket 95 attached to the rear end of one of the upper tracks 52, as shown in FIGS. 1 and 2, to the upper track 52. These forces pull the rear end of the upper track 52 upward and tend to separate the upper track 52 from the lower track 50. During such upward force, each side wall 60 of the lower track 50 will start to bend outward from the longitudinal center of the lower track 50 in the direction shown in FIG. 5. At the same time, the upward forces exerted on the upper track 52 will pull the rear end of the upper track 52 upward a sufficient amount to cause a deformation or bending of the flanges 86 on the side legs 82 and 84 of the upper track 52. Under a sufficient force, the abutment 90 on the lower end of the side legs 82 and 84 of the upper track 52 will be moved upward into engagement with the abutment surface 70 in each side wall 60 of the lower track 50, as shown in FIG. 5. In this position, the various interconnected flanges of the upper and lower tracks 52 and 50 will resist separation of the upper track 52 from the lower track 50 under low force loads as typically occur in the beginning stages of a collision.

Figure 6:
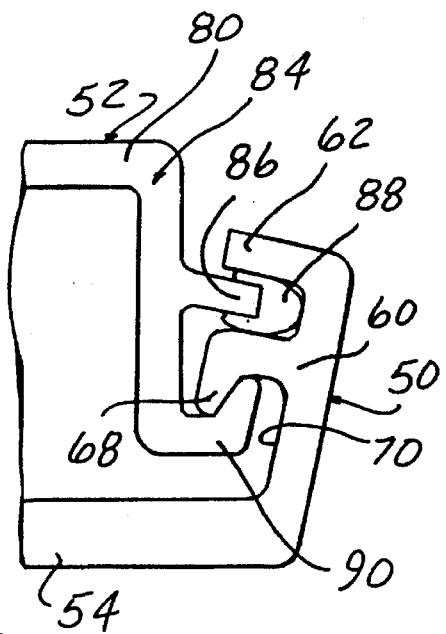
FIG. 6 is a partial end view showing the position of the upper and lower tracks during high force loads encountered during the later stage of a vehicle collision.

However, when higher forces are encountered, such forces will pull the upper track 52 further out of the lower track 50 in an upward direction bringing the various flanges and walls of the upper and lower tracks 52 and 50 to the position shown in FIG. 6. In this position, the flange 86 on the side legs 82 and 84 of the upper track 52 will remain engaged with the top flange 62 of the corresponding side leg 60 of the lower track 50. However, the upward movement of the abutment 90 on the side legs 82 and 84 of the upper track 50 will deform the intermediate flange 68 on the side leg 60 of the lower track 50 bringing the intermediate flange 68 into engagement with the flange 86 on the upper track 52. In this position, as shown in FIG. 6, the flanges 62 and 86, and the abutments 68 and 90 are in full engagement with each other to form a self-cinching action which resists further separation of the upper track 52 from the lower track 50.

In view of the self-cinching action thus described, each lower track 50 and each upper track 52 is preferably in the form of an elongated, one-piece, integral member which is stamped, extruded or otherwise formed from a suitable high strength, lightweight material. Preferably, each lower track 50 and each upper track 52 is formed as a one-piece, unitary extrusion of high strength aluminum or aluminum alloy.

In order to stationarily affix the power seat adjuster 10 to the vehicle, such as to the floor of the vehicle, a front riser 100, shown in FIG. 2 and a rear riser 102 are attached to each lower track 50 at opposite ends thereof. The front riser 100 and the rear riser 102 provide a mounting connection to the vehicle floor by means of bolts or other suitable fasteners or anchors, not shown.

Figure 7:
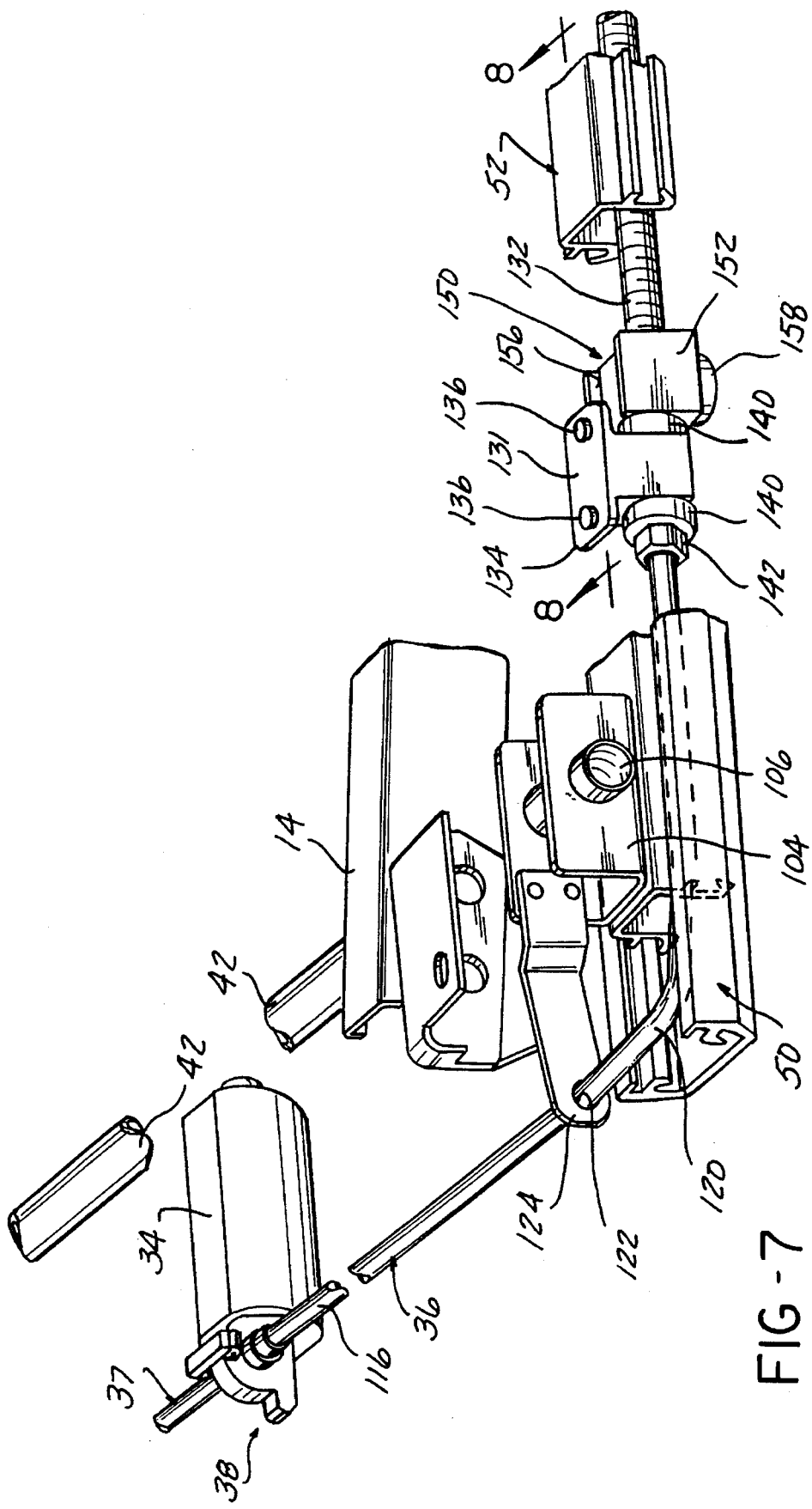
FIG. 7 is a partial, perspective view of the horizontal drive mechanism of the power seat adjuster shown in FIG. 1.

Further, as shown in FIGS. 1, 2 and 7, each torsion tube 42 and 44 is rotatably mounted in suitable mounting brackets denoted generally by reference number 104 which are fixed to opposite ends of each upper track 52. A fastener 106, such as a conventional push nut, is mounted on the outer end of each torsion tube 42 and 44 to securely retain each torsion tube 42 and 44 in the associated mounting bracket 104.

Figure 3:
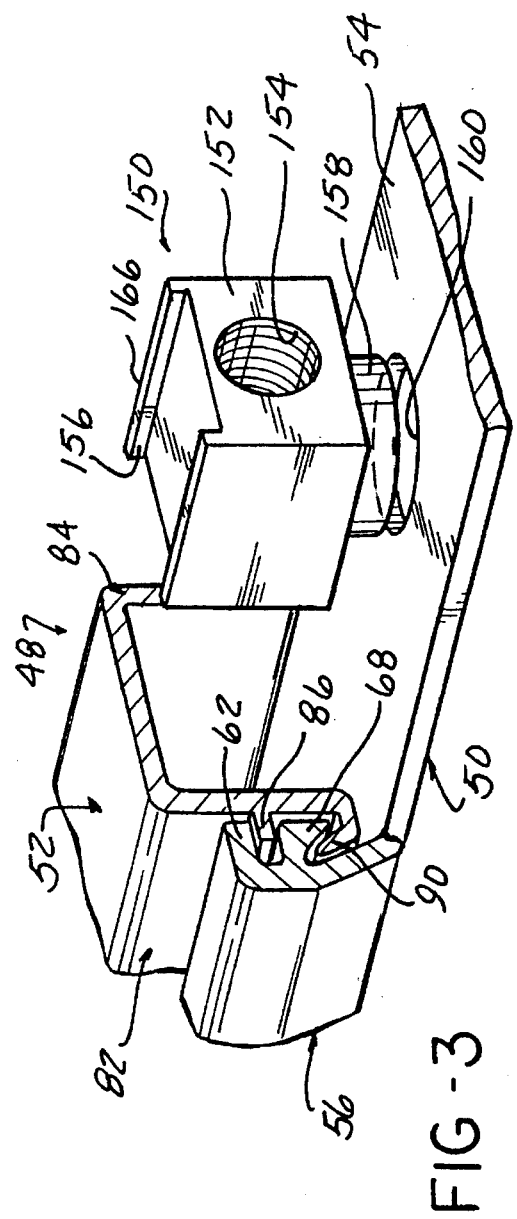
FIG. 3 is a partial, perspective view depicting the track assembly and drive nut mounting of the power seat adjuster shown in FIGS. 1 and 2.

Referring now to FIGS. 3, 7 and 8, there is depicted a detailed construction of the horizontal drive mechanism for the power seat adjuster 10. As described above, the bi-directional, electric horizontal drive motor 34 is mounted by a suitable bracket or other mounting members to the upper tracks 52 of the power seat adjuster 10, and is typically located between the track assemblies 46 and 48 as shown in FIG. 1. The motor 34 has a rotatable output shaft, not shown, which rotates in either of two directions depending upon the selective mode of energization of the motor 34. A gear means 38 in the form of a gear box or gear assembly is integrally formed as part of the motor 34 and is connected to the output shaft of the motor 34. The gear means 38 functions to convert rotation of the output shaft of the motor 34 to rotation of the two horizontal drive shafts 36 and 37. The gear means 38 may also be mounted separate from the motor 34 while still being coupled to the output shaft of the motor 34. A suitable gear reduction may be implemented by the gear means 38 so as to provide a low speed of rotation with high torque to the drive shafts 36 and 37.

As shown more clearly in FIG. 8, each of the drive shafts 36 and 37, such as the drive shaft 36, is preferably in the form of a flexible shaft having a helical wound steel core 112 surrounded by a protective covering or sheath 114.

According to another aspect of the present invention, as shown in FIGS. 7 and 8, each flexible drive shaft 36 and 37, such as the flexible drive shaft 36, is formed with a first axial end 116 and a second axial end 118 which are interconnected by an intermediate arcuate portion 120. The first axial end 116 of the drive shaft 36 is coupled to the gear means 38 as shown in FIG. 7. The second axial end 118 of the drive shaft 36 is fixedly coupled to a driven shaft as described hereafter.

As shown in FIG. 7, the intermediate portion 120 of the drive shaft 36 interconnects the first and second axial ends 116 and 118, respectively, thereof, with the first and second axial ends 116 and 118 being disposed at any angular orientation with respect to each other. By way of example only, the first and second axial ends 116 and 118 of the drive shaft 36 are disposed substantially perpendicular to each other. It will be understood that other angular orientations of the first and second axial ends 116 and 118 of the drive shaft 36 may also be possible depending upon the mounting position of the horizontal drive motor 34 with respect to the driven shaft(s).

While the intermediate arcuate portion 120 of the drive shaft 36 may be arcuately curved and/or supported in any shape between the first and second axial ends 116 and 118, it is preferred that the intermediate portion 120 extend through suitable stationary structure on the power seat adjuster 10 in an approximate 90° bend in order to minimize buckling of the flexible drive shaft 36. As shown in FIG. 7, the intermediate portion 120 of the drive shaft 36 extends through an open-ended slot 122 formed in a support arm 124 attached to the bracket 104 on the upper track 52 of the track assembly 48. It will be understood that the flexible drive shaft 37 is shaped in a similar manner and is also extends through stationary structure on the opposite track assembly 46 of the power seat adjuster 10. In lieu of passage through stationary structure of the power seat adjuster, the desired shape of the flexible drive shaft 36 between its axial ends 116 and 118 may also be achieved on forming the sheath or housing for the flexible drive shaft 36 of a rigid or semi-rigid metal or plastic which is formed to the desired shape for routing the drive shaft 36 between its axial ends 116 and 118.

The second axial end 118 of the drive shaft 36 narrows down to a smaller diameter neck portion 126 which has a square or D shape to slidably and non-rotatably fit within a complementary shaped bore 128 formed in a necked down end portion 130 at a first end of a driven shaft 132. Preferably, the driven shaft 132 is a conventional, externally threaded lead screw.

A bearing block 131 is mounted through an aperture formed in the top wall 80 of the upper track 52 and extends through the upper track 52 into the interior space formed between the upper track 52 and the lower track 50 as shown in FIG. 8. Enlarged flanges 134 are formed on two ends of the bearing block 131 and act as a mounting surface for fasteners, such as rivets 136, which extend through the mounting flange 134 into the top wall 80 of the upper track 52 to fixedly mount the bearing block 131 to the upper track 52. An internal, smooth bore 138 extends through the bearing block 131 and rotatably receives the fixed connection between the narrowed down necked portion 126 at the second axial end 118 of the drive shaft 36 and the neck portion 130 at the first end of the lead screw or driven shaft 132. Steel washers 140 are mounted on opposite sides of the bearing block 131. A fastener, such as a threaded nut 142, engages the drive shaft 36 to fixedly retain both of the washers 140 and the second axial end 118 of the drive shaft 36 in position with respect to the bearing block 131.

The use of a flexible drive shaft 36 and 37 with the axial ends 116 and 118 and intermediate arcuate portion 120 described above provides significant advantages in the construction of the power seat adjuster 10. Since the flexible drive shaft 36 or 37 is formed with opposed axial ends 116 and 118 mounted between a non-axially oriented drive motor and a driven shaft or lead screw 132, a separate gear assembly for each drive shaft 36 or 37 to connect the drive shaft 36 or 37 to a respective lead screw 132 can be replaced by a single gear assembly 38 as shown in FIGS. 1 and 7. This eliminates one gear assembly from the normal two or three gear assemblies previously used on a horizontal drive assembly for a power seat adjuster. One of the gear assemblies may also be eliminated from the seat recliner drive mechanism in the same manner. The elimination of one gear assembly from the horizontal drive and/or the seat back recliner drive reduces the overall cost of the power seat adjuster, reduces the noise and vibrations associated with the use of multiple gear assemblies on the horizontal or seat recliner drive mechanisms employing a single drive motor and simplifies the packaging and mounting of the lead screw 132 within the track assemblies 46 or 48. In addition, since the drive shafts 36 and 37 are flexible, the drive motor 34 may be located at any desired position within the power seat adjuster 10 thereby simplifying the design and assembly of the power seat adjuster 10. Such design characteristics may also contribute to a reduction in the amount of space consumed by the drive mechanisms below the seat so as to increase the open space below the seat. A suitable gear reduction in the single gear assembly 38 provides a slower speed of rotation of the drive shaft at a higher torque. This also contributes to a reduction in the noise and vibration of the drive assembly thereby creating a more pleasing sound and operating characteristics for the power seat adjuster 10.

Referring again to FIGS. 3, 7 and 8, a drive block 150 is employed to transfer rotation of the driven shaft or lead screw 132 to translation of the upper track 52 in a horizontal fore or aft direction with respect to the lower track 50 upon selective energization of the horizontal drive motor 34. The drive block 150 is preferably formed of a suitable plastic material, such as glass filled nylon or acetal. The drive block 150 could also be formed of metal. Further, the drive block 150 is formed of a generally cubical body 152 having a square or rectangular shape. A threaded bore 154 extends through the body 152 of the drive block 150 and threadingly engages the lead screw 132. A recess 156 is formed in an upper surface of the body 152 to provide clearance for various rivets or fasteners mounted in the top wall 80 of the upper track 52 as the upper track 52 traverses along the lower track 50.

Means are provided for rotatably and translatingly mounting the drive block 150 in the central base 54 of the lower track 50 as shown in FIGS. 3 and 8. The mounting means preferably comprises a cylindrical boss 158 which is integrally formed with and extends outward from the body 152 of the drive block 150. The cylindrical boss 158 is freely rotatably and vertically translatingly mounted in a slightly larger diameter aperture 160 formed in the central base 54 of the lower track 50. As shown in FIG. 8, the free mounting of the drive block 150 in the aperture 160 in the lower track 50 enables the drive block 150 to freely rotate in the direction of arrow 162 about a vertical axis extending through the cylindrical boss 158. In addition, the drive block 150 may also vertically translate in the direction of arrow 164 within the aperture 160 in the lower track 50. However, it should be noted that the drive block 150 is retained in the aperture 160 in the lower track 50 due to the close mounting of the upper surface of the body 152 of the drive block 150 to the top wall 80 of the upper track 52 as shown in FIG. 8. This small spacing or gap between the top edge 166 of the body 152 of the drive block 150 and the adjacent top wall 80 of the upper track 52 still enables the above-described vertical translation of the drive block 150. However, the maximum amount of such vertical translation before the top edge 166 contacts the top wall 80 of the upper track 52 is less than the amount of extension of the cylindrical boss 158 through the central base 54 of the lower track 50 thereby maintaining the drive block 150 within aperture 160 in the lower track 50 at all times.

This free mounting of the drive block 150 in the lower track 50 provides a self-aligning feature which permits the drive block 150 to automatically compensate for any dimensional irregularities, angular offset, etc. between the lead screw 132 and the position of the drive block 150.

In addition to the advantages described above, the free mounting of the drive block 150 in the lower track 50 also provides a cost reduction for the power seat adjuster due to the elimination of mounting brackets and/or fasteners typically employed to fixedly attach a drive block to a lower track as in previously devised power seat adjusters. Assembly of the drive block 150 in the power seat adjuster 10 is also simplified for additional savings in labor and assembly time since the drive block 150 is merely inserted in the aperture 160 in the lower track 50. In addition, under a crash load, forces on the lead screw 132 will cause the drive block 150 to tilt within the aperture 150 and thereby contact and wedge between the top wall 80 of the upper track 52 and the central base 54 of the lower track 50 to increase separation resistance of the upper track 52 from the lower track 50.

In operation, selective energization of the horizontal drive motor 34 will cause the drive shafts 36 and 37 to rotate in a particular direction of rotation. This rotation is transmitted by the flexible drive shafts 36 and 37 to simultaneous rotation of the associated lead screw 132 through the fixed connection between the lead screw 132 and the second axial end 118 of the drive shaft 36 or 37, as shown in FIG. 8. Since the lead screw 132 is threadingly engaged with the bore 154 in the drive block 150, and, further, since the drive block 150 is fixedly axially retained in the aperture 160 in the lower track 50 and the bearing block 131 carrying the drive shaft 36 to the lead screw 132 connection is fixed to the upper track 52, such rotation of the lead screw 132 results in a horizontal fore and aft translation of the upper track 52 with respect to the lower track 50 thereby enabling the upper track 52 and the seat support frame members 12 and 14 mounted thereon to be positioned in any desired, user selectible horizontal fore and aft position with respect to the lower track 50.

The power seat adjuster 10 is also provided with a unique self-aligning lead screw actuation mechanism. Although the self-aligning lead screw actuation mechanism may be advantageously employed with any of the horizontal, seat recliner and vertical elevation lead screws, the following description will describe the features of the self-aligning lead screw actuation mechanism only with respect to the seat recliner drive mechanism and the front and rear vertical elevation drive mechanisms.

The seat recliner drive motor 26 is typically located between the track assemblies 46 and 48 as shown in FIG. 1 and is attached by suitable brackets, not shown, to one of the seat support frames 12 or 14. The motor 26 has a rotatable output shaft, not shown, which is coupled to a gear means 170. Two seat recliner drive shafts 28 and 29 are coupled to the gear means 170 and extend outward from opposite sides of the gear means 170 to a connection with respective lead screws mounted in the track assemblies 48 and 46.

Each drive shaft 28 and 29 is identically constructed, except for possible length variations, such that the following description will be provided only with respect to the drive shaft 28. As shown in FIGS. 1, 9 and 10, the drive shaft 28 is preferably formed of a flexible shaft having a first axial end portion 172 and an opposed second axial end portion 174. An intermediate, arcuate shaped portion 176 interconnects the first and second axial end portions 172 and 174. As described above for the horizontal drive shaft 36, the intermediate arcuate shaped portion 176 of the drive shaft 28 is preferably fitted through stationary structure on the power seat adjuster 10. As shown in FIG. 9, the intermediate portion 176 of the drive shaft 28 passes freely through an aperture 178 in the seat support frame member 14.

As shown in FIG. 10, the drive shaft 28 is preferably formed of a flexible, helically wound steel core 180 which is covered by a plastic sheath or cover 182. The second axial end 174 of the drive shaft 28 terminates in a necked down portion 184 which fits within a suitably formed bore in a necked down first end portion 186 of a seat recliner driven shaft 188 which is preferably in the form of an externally threaded lead screw.

The fixed connection between the second axial end 174 of the drive shaft 28 and the first end 186 of the driven shaft or lead screw 188 is rotatably mounted in a bearing block 190 which is mounted in a suitably formed housing 192 attached by means of fasteners 194 to the seat support member 14. The housing 192 is preferably formed of metal and has opposed side walls 196 and 198 which are interconnected at one end by an end wall 200. An aperture 202 is formed in the end wall for passage of the second axial end 174 of the drive shaft 28 therethrough. Open-ended slots 204 are formed in the side walls 196 and 198. The slots 204 are formed with parallel sides which open at an inner end to an enlarged diameter circular aperture.

The bearing block 190 is preferably in the form of a cylindrical body having a smooth bore 206 extending axially therethrough. Steel washers 208 are mounted about each end of the cylindrical-shaped bearing block 190. A fastener 210, such as a threaded nut, is further mounted about the second axial end 174 of the drive shaft 28 to secure the drive shaft 28 and the washers 208 to the bearing block 190.

The bearing block 190 is formed with a pair of lugs which extend transversely to the longitudinal axis of the bearing block 190 outward from opposite sides of the bearing block 190. The lugs 210 are shaped with flats to pass through the slot 204 and then rotated to bring arcuate ends into rotatable contact with the enlarged circular shaped aperture formed at the inner end of each of the slots 204 in the side walls 196 and 198 of the housing 192. It should further be noted, as shown generally in FIG. 1, that the width or diameter of the cylindrical bearing block 190 is slightly smaller than the width or spacing between the side walls 196 and 198 of the housing 192. This permits the bearing block 190 to be capable of translation in the direction of arrow 212 in FIGS. 9 and 10 with respect to the housing 192 to provide self-aligning features. In addition, the bearing block 190 is freely rotatable about an axis extending through the lugs 210 transverse to the longitudinal axis of the bearing block 190 as shown by arrow 214 to enable the bearing block 190 to pivot or rotate within the housing 192. The above-described rotation and translation features of the bearing block 190 provide a self-aligning feature which enables the bearing block 190 to adjust for any dimensional or angular discrepancies between the linear and/or axial positions of the lead screw 188 and the drive shaft 28.

As shown in FIGS. 9 and 10, a drive block 220 is mounted in a link 222. The drive block 220 is in the form of a cylindrical body having an internally threaded bore 221 which threadingly engages the threaded driven shaft or lead screw 188. A pair of lugs 224 extend outwardly from the drive block 220 transversely to the longitudinal axis of the bore 221. The lugs 224 preferably have opposed arcuate ends interconnected by opposed flats and may optionally be provided with enlarged heads at outer ends thereof.

The link 222 functions to mount the drive block 220 in a fixed axial position with respect to one end of the link 222. The link 222 also transmits axial movement of the drive block 220 upon rotation of the lead screw 188, as described hereafter, in a translating manner to pivotal rotation of a seat back extension 226 which is pivotally connected by pivot pin 228 to a second end 230 of the link 222.

One end of the link 222 is formed in a generally U-shape with a pair of spaced legs 232 and 234, each of which is divided into two separate leg portions by a parallel sided slot 236 which opens to an enlarged, circular shaped aperture 238 at an inner end of each slot 236. The aperture 238 in the legs 232 and 234 rotatably receives the lugs 224 on the drive block 220 to mount the drive block 220 in a fixed axial position with respect to the link 222. However, the drive block 220 is capable of pivotal or rotational movement in the direction of arrow 240 about an axis extending through the pair of lugs 224 transversely to the longitudinal axis of the bore 221 in the drive block 220.

As shown in FIG. 10, the diameter of the drive block 220 is smaller than the spacing between the legs 232 and 234 at one end of the link 222. This enables the drive block 220 to translate between the legs 232 and 234 of the link 222 in the direction of arrow 242 shown in FIGS. 9 and 10. The combination of the free rotation of the drive block 220 and the free translation of the drive block 220 within the legs 232 and 234 at one end of the link 222 provides additional self-aligning features to the seat recliner drive mechanism to accommodate for any dimensional and structural differences in the dimensions and angular positions of the lead screw 188 and the link 222.

As described above, the power seat adjuster 10 also includes vertical elevation drive means. Separate front and rear vertical elevating drive mechanisms, each selectively independently operable of the other, are mounted on the power seat adjuster 10. The front and rear vertical drive mechanisms each include a vertical drive motor 24 and 22, respectively, as shown in FIG. 1. Since the front and rear vertical drive mechanisms are identically constructed, the following description will be provided only with respect to the rear elevating drive mechanism, it being understood that the front elevating drive mechanism is similarly constructed.

As shown in FIGS. 11 and 12, the rear vertical drive motor 22 has a rotatable output shaft, not shown, which is integrally connected to a gear means 250. The gear means 250 is mounted in a housing which is pivotally mounted in a bracket 252 affixed to the seat support frame member 12. A rear vertical lead screw 254 is coupled to the gear means 250 and extends rotatably outward therefrom. A drive block 256, substantially the same as the drive block 220 described above and shown in FIGS. 9 and 10, is threadingly engaged with the lead screw 254. The drive block 256 is in the form of a cylindrical body having an internally threaded bore which threadingly engages the lead screw 254. A pair of transversely extending lugs 258 formed with arcuate ends and flats extend outward from the cylindrical body of the drive block 256 and rotatably engage slots 260 formed in spaced legs 262 and 264 at one end of a drive link or member 266 in the same manner as that described above for the drive block 220. In this manner, the drive block 256 is capable of pivotal or rotational movement in the direction of arrow 270 about an axis extending through the pair of lugs 258 within one end of the drive link 266. At the same time, the diameter of the drive block 256 is slightly smaller than the spacing between the legs 262 and 264 at one end of the drive link 266 to enable translation of the drive block 256 in the direction of arrow 272 within the one end of the drive link 266.

In a conventional manner, as shown in FIG. 12, a second end 280 of the drive link 266 is pivotally connected by pivot pin 282 to a link 284 which is fixedly mounted about one end of the rear torsion tube 44. A motion link 286 is in turn pivotally connected to one end of the link 284 and, at a second end 288, to a rear end of the seat support frame member 12.

In operation, energization of the drive motor 22 results in rotation of the lead screw 254. Since the drive block 256 is axially fixed within one end of the drive link 266, such rotation of the lead screw 254 causes translation of the drive block 256 along the lead screw 254. This translation is transmitted directly to translation of the drive link 266 which causes pivotal movement of the link 284. Pivotal movement of the link 284 is translated to rotation of the rear torsion bar 44 and rotation of the motion link 286 to affect selective elevation, (i.e., raising or lowering) of the rear end of the seat support frame member 12. A similar link 286 is attached to the opposite end of the rear torsion bar 44 to cause a simultaneous and like elevation of the rear end of the opposite seat support frame member 14 upon rotation of the rear torsion tube 44 as described above.

In summary, there has been disclosed a power seat adjuster having unique features which provide significant advantages over previously devised power seat adjusters. The power seat adjuster of the present invention is provided with a unique end driven lead screw actuation by means of flexible shafts interconnecting a single motor and a single gear assembly with each lead screw in an axial end connection with the lead screw. This eliminates a number of gear assemblies to reduce the cost and weight of the power seat adjuster as well as achieving significant advantages with respect to reduced noise and smooth operation of the power seat adjuster. The power seat adjuster is also provided with self-aligning lead screw actuator and self-aligning bearing blocks and drive blocks which simplifies assembly and additionally provides a smooth operation of the power seat adjuster by automatically compensating for any dimensional or angular deviation from nominal component design and manufacturing tolerances.

What is claimed is:

1. A drive apparatus for a power seat adjuster having a first component movable relative to a second component comprising:

a rotatable drive shaft having first and second axial ends and an intermediate portion connecting the first and second axial ends;

a driven shaft;

means, adapted to be coupled to the driven shaft and the first component, for moving the first component relative to the second component upon rotation of the driven shaft;

the second end of the drive shaft co-axially connected to the driven shaft in a fixed connection for simultaneous rotation of the drive shaft and the driven shaft; and means for rotating the first axial end of the drive shaft.

2. The drive apparatus of claim 1 wherein the drive shaft is flexible.

3. The drive apparatus of claim 2 wherein:

the first and second axial ends of the drive shaft are oriented non-co-axially with respect to each other.

4. The drive apparatus of claim 3 wherein:

the first and second axial ends of the drive shaft are oriented substantially perpendicular to each other.

5. The drive apparatus of claim 1 wherein the rotating means comprises:

a drive motor having a rotatable output shaft; and gear means, coupled to and driven by the output shaft of the motor and connected to the first axial end of the drive shaft, for transmitting rotation of the output shaft of the motor to rotation of the drive shaft.

6. The drive apparatus of claim 1 further comprising:

means, adapted to be mounted on the first component, for rotatably housing the fixed connection between the drive shaft and the driven shaft.

7. A power seat adjuster for a vehicle comprising:

first and second track assemblies, each formed of a lower track adapted to be fixed on the vehicle and an upper track slidably mounted in the lower track;

drive motor means;

a first drive shaft coupled to the drive motor means and rotated by the drive motor means, the first drive shaft having first and second axial end portions and an intermediate portion connecting the first and second axial ends;

a first driven shaft;

means for co-axially connecting the second axial end of the first drive shaft to the first driven shaft in a fixed connection to transmit rotation of the drive shaft to the driven shaft; and means, responsive to rotation of the driven shaft, for effecting relative movement of the upper track with respect to the lower track.

8. The power seat adjuster of claim 7 wherein:

the intermediate portion of the first drive shaft extends through a stationary structure on the power seat adjuster.

9. The power seat adjuster of claim 7 wherein the drive motor means comprises:

a drive motor having a rotatable output shaft; and gear means, coupled to and driven by the output shaft of the motor, for rotating the first axial end of the drive shaft.

10. The power seat adjuster of claim 7 further comprising:

a pivotal seat back arm, movable with respect to a seat support;

second drive motor means;

a second drive shaft coupled to the second drive motor means and rotated by the second drive motor means, the second drive shaft having first and second axial end portions and an intermediate portion connecting the first and second axial ends;

a second driven shaft;

means for co-axially connecting the second axial end of the second drive shaft to one end of the second driven shaft in a fixed connection to transmit rotation of the second drive shaft to the second driven shaft;

means for rotatably mounting the fixed connection between the first axial end of the second drive shaft and the one end of the second driven shaft to the seat support;

a driven member coupled to the pivotal seat back arm and the second driven shaft, the driven member pivoting the seat back arm upon movement of the driven member; and means, connected to the driven member, and engaging the second driven shaft, for transmitting rotation of the second driven shaft to movement of the driven member.

11. The power seat adjuster of claim 7 further comprising:

means, mounted on the upper track, for rotatably housing the fixed connection between the first drive shaft and the first driven shaft.

12. The power seat adjuster of claim 7 wherein the first drive shaft is a flexible shaft.

13. The power seat adjuster of claim 12 wherein:

the first and second axial ends of the drive shaft are oriented non-co-axially with respect to each other.

14. The power seat adjuster of claim 13 wherein the first and second axial ends of the first drive shaft are oriented substantially perpendicular to each other.

15. A power seat adjuster for a vehicle comprising:

first and second track assemblies, each formed of a lower track adapted to be fixed on the vehicle and an upper track slidably mounted in the lower track;

drive motor means;

a first drive shaft coupled to the drive motor means and rotated by the drive motor means, the first drive shaft having first and second axial end portions and an intermediate portion connecting the first and second axial ends;

a first driven shaft;

means for co-axially connecting the second axial end of the first drive shaft to the first driven shaft in a fixed connection to transmit rotation of the drive shaft to the driven shaft, the means for co-axially connecting including:

bracket means fixedly mounted to an upper track; and a housing rotatably receiving a fixed connection between the second axial end of the first drive shaft and one end of the first driven shaft, the housing mounted in the bracket means; and means, responsive to rotation of the driven shaft, for effecting relative movement of the upper track with respect to the lower track.

16. The power seat adjuster of claim 15 further comprising:

a second drive shaft coupled to the drive motor means and having first and second axial end portions interconnected by an intermediate portion;

a second driven shaft; and means for co-axially connecting the second axial end of the second drive shaft to the second driven shaft in a fixed connection to transmit rotation of the second drive shaft to the second driven shaft.

17. The power seat adjuster of claim 16 wherein the drive motor means comprises:

a drive motor having a rotatable output shaft; and gear means, driven by the output shaft of the drive motor, for rotating the first axial ends of the first drive shaft and the second drive shaft.

18. The power seat adjuster of claim 16 wherein the means for co-axially connecting the second axial end of the second drive shaft to the second driven shaft comprises:

another bracket means fixedly mounted to another upper track; and another housing rotatably receiving the fixed connection between the second axial end of the second drive shaft to the end of the second driven shaft, the housing mounted in the bracket means.

19. The power seat adjuster of claim 18 wherein:

the first and the second drive shafts are flexible shafts.

20. The power seat adjuster of claim 19 wherein the first and second axial ends of both of the first drive shaft and the second drive shaft are oriented substantially perpendicular to each other.

21. The power seat adjuster of claim 20 wherein:

the intermediate portion of each of the first drive shaft and the second drive shaft extends through stationary structure on the power seat adjuster.

22. A seat back recliner for a vehicle having a seat back movable relative to a seat bottom, the seat bottom mounted on first and second track assemblies, each formed of a lower track adapted to be fixed to the vehicle and an upper track movably mounted on the lower track, the seat back recliner comprising:

a drive motor means;

a first drive shaft coupled to the drive motor means and rotated by the drive motor means, the first drive shaft having first and second axial end portions and an intermediate portion connecting the first and second axial ends;

a first driven shaft;

means for co-axially connecting the second axial end of the first drive shaft to one end of the first driven shaft in a fixed connection to transmit rotation of the first drive shaft to the driven shaft; and means, adapted to be connected between the driven shaft and the seat back, for translating rotation of the driven shaft to pivotal movement of the seat back relative to the seat bottom.

23. The seat back recliner of claim 22 wherein:

the intermediate portion of the first drive shaft is adapted to extend through one of the first and second track assemblies.

24. The seat back recliner of claim 22 wherein the drive motor means comprises:

a drive motor having a rotatable output shaft; and gear means, coupled to and driven by the output shaft of the motor, for rotating the first axial end of the drive shaft.

25. The seat back recliner of claim 22 wherein the translating means comprises:

means for rotatably mounting the connection between the first axial end of the first drive shaft and the one end of the driven shaft to one of the first and second track assemblies;

a driven member adapted to be pivotally coupled to the seat back, the driven member pivoting the seat back upon translation of the driven member; and means, connected to the driven member and engaging the driven shaft, for transmitting rotation of the driven shaft to translation of the driven member.

26. The seat back recliner of claim 22 further comprising:

means, adapted to be mounted on one of the first and second track assemblies, for rotatably housing the fixed connection between the first drive shaft and the first driven shaft.

27. The seat back recliner of claim 22 wherein the first drive shaft is a flexible shaft.

28. The seat back recliner of claim 27 wherein:

the first and second axial ends of the first drive shaft are oriented non-co-axially with respect to each other.

29. The seat back recliner of claim 28 wherein the first and second axial ends of the first drive shaft are oriented substantially perpendicular to each other.

30. A seat back recliner for a vehicle having a seat back movable relative to a seat bottom, the seat bottom mounted on first and second track assemblies, each formed of a lower track adapted to be fixed to the vehicle and an upper track movably mounted on the lower track, the seat back recliner comprising:

a drive motor means;

a first drive shaft coupled to the drive motor means and rotated by the drive motor means, the first drive shaft having first and second axial end portions and an intermediate portion connecting the first and second axial ends;

a first driven shaft;

means for co-axially connecting the second axial end of the first drive shaft to one end of the first driven shaft in a fixed connection to transmit rotation of the first drive shaft to the driven shaft, the means for co-axially connecting including:

bracket means adapted to be fixedly mounted to one of the first and second track assemblies; and a housing receiving a fixed connection between the second axial end of the first drive shaft and one end of the first driven shaft, the housing mounted in the bracket means; and means, adapted to be connected between the driven shaft and the seat back, for translating rotation of the driven shaft to pivotal movement of the seat back relative to the seat bottom.

* * * * *